United States Patent
Drory et al.

(10) Patent No.: US 9,572,199 B2
(45) Date of Patent: Feb. 14, 2017

(54) MULTIMODE RAKE RECEIVER, CELLULAR BASE STATION AND CELLULAR COMMUNICATION DEVICE

(75) Inventors: Guy Drory, Givaataim (IL); Eliya Babitsky, Caesaria (IL); Ron Bercovich, Kfar-Saba (IL)

(73) Assignee: NXP USA, INC., Austin, TX (US)

( * ) Notice: Subject to any disclaimer, the term of this patent is extended or adjusted under 35 U.S.C. 154(b) by 0 days.

(21) Appl. No.: 14/241,233

(22) PCT Filed: Oct. 19, 2011

(86) PCT No.: PCT/IB2011/054657
§ 371 (c)(1),
(2), (4) Date: Feb. 26, 2014

(87) PCT Pub. No.: WO2013/057541
PCT Pub. Date: Apr. 25, 2013

(65) Prior Publication Data
US 2014/0220917 A1  Aug. 7, 2014

(51) Int. Cl.
*H03D 5/00* (2006.01)
*H04W 92/02* (2009.01)
(Continued)

(52) U.S. Cl.
CPC ........... *H04W 92/02* (2013.01); *H04B 1/005* (2013.01); *H04B 1/06* (2013.01); *H04B 1/16* (2013.01);
(Continued)

(58) Field of Classification Search
CPC .......... H04W 92/02; H04B 1/16; H04B 1/005; H04B 1/06; H04B 1/7115; H04B 2201/70714
See application file for complete search history.

(56) References Cited

U.S. PATENT DOCUMENTS 5,790,588 A * 8/1998 Fukawa ............... H04B 1/7103
370/342
2002/0181559 A1  12/2002 Heidari-Bateni et al.
(Continued)

FOREIGN PATENT DOCUMENTS

CN  1669243  9/2005
CN  102197601 A  9/2011
(Continued)

OTHER PUBLICATIONS

International Search Report and Written Opinion correlating to PCT/IB2011/054657 dated Jul. 30, 2012.

*Primary Examiner* — Yuwen Pan
*Assistant Examiner* — Fatuma Sherif

(57) ABSTRACT

A multimode rake receiver comprise a common antenna interface, arranged to at least receive in a first mode a first CDMA radio channel carrying information encoded according to a first baseband modulation standard and to receive in a second mode a second CDMA radio channel carrying information encoded according to a second baseband modulation standard; and a common signal processing path, at least arranged to process in the first mode the first CDMA radio channel and in the second mode the second CDMA radio channel, wherein the common signal path comprises a common descrambling and de-spreading unit and a common hybrid code generating unit arranged to provide to the common descrambling and de-spreading unit chip codes applicable in the first mode to the first CDMA radio channel and in the second mode to the second CDMA radio channel.

20 Claims, 1 Drawing Sheet

(51) Int. Cl.
*H04B 1/06* (2006.01)
*H04B 1/7115* (2011.01)
*H04B 1/00* (2006.01)
*H04B 1/16* (2006.01)

(52) U.S. Cl.
CPC ... *H04B 1/7115* (2013.01); *H04B 2201/70714* (2013.01)

(56) References Cited

U.S. PATENT DOCUMENTS

| | | | |
|---|---|---|---|
| 2003/0142639 A1* | 7/2003 | Cheung et al. | 370/321 |
| 2003/0186666 A1* | 10/2003 | Sindhushayana | 455/260 |
| 2005/0079890 A1 | 4/2005 | Yu | |
| 2007/0263704 A1 | 11/2007 | Nagarajan et al. | |
| 2008/0242237 A1 | 10/2008 | Rofougaran et al. | |
| 2010/0278167 A1* | 11/2010 | Yu et al. | 370/342 |

FOREIGN PATENT DOCUMENTS

| | | |
|---|---|---|
| GB | 2397986 B | 8/2004 |
| WO | 0211309 A1 | 2/2002 |

* cited by examiner

MULTIMODE RAKE RECEIVER, CELLULAR BASE STATION AND CELLULAR COMMUNICATION DEVICE

FIELD OF THE INVENTION

This invention relates to a multimode rake receiver, a cellular base station and a cellular communication device.

BACKGROUND OF THE INVENTION

In wireless telecommunications, radio signals propagate from a sender to a receiver on multiple paths due to, for example, reflection from buildings or other objects. Multipath components are the original signal and echoes of the original transmitted signal traveling through different paths. Multipath components arrive at the receiver each with a different magnitude, phase and time-of-arrival, causing constructive and destructive interference and phase shifting of the signal at the receiver side.

A rake receiver is a radio receiver designed to counter the effects of multipath fading. It contains sub-receivers with correlators, each assigned to a different multipath component. Each component contains the original information and if the magnitude and phase of each component is computed at the receiver, all components can be added coherently to improve the information reliability. Each correlator independently decodes a single multipath component, and the contributions of the correlators are combined.

For cellular telephone networks, several standards for enabling the radio-based communication link between a cellular phone or other mobile station or cellular communication device and a cellular base station are available, employing different channel access methods.

Code division multiple access (CDMA) is a channel access method used by various radio communication technologies. CDMA employs a spread-spectrum technology and a coding scheme, i.e., the coded baseband modulated signal has a higher data bandwidth than the transmitted data, wherein each channel, i.e. each signal, for transmitting data from a sender to a receiver is assigned a code to allow multiple channels to be multiplexed over the same frequency band or physical channel.

The W-CDMA (Wideband Code Division Multiple Access) standard partly makes use of the CDMA channel access method and is the basis of the FOMA (Freedom of Mobile Multimedia Access) third generation telecommunications service in Japan. UMTS (Universal Mobile Telecommunications System) is a third generation mobile cellular technology for networks based on the GSM standard and widely used in Europe. UMTS is a component of the International Telecommunications Union IMT-2000 standard set and also uses the W-CDMA radio access technology standard.

CDMA2000, or IMT Multi Carrier (IMT MC), is a family of third generation (3G) mobile technology standards, for example used in the United States of America. It also partly employs the CDMA channel access method for communication between cellular phones and cellular base stations.

W-CDMA and CDMA2000 are both based on descrambling and de-spreading the received channel data, utilizing a rake receiver, but nonetheless receivers are usually built as separate devices, because several components are usually implemented differently to comply with the respective standard requirements. For example, W-CDMA and CDMA2000 use different scrambling codes and different spreading codes. W-CDMA contains the channel processing steps of descrambling and de-spreading serially one after another; while in CDMA2000 systems, they may be performed at different stages. W-CDMA has complex-valued channels, while CDMA2000 has both complex and non-complex channels. W-CDMA has asynchronous users, while CDMA2000, at least partly, has synchronous users. W-CDMA has a slot length different from that of CDMA2000, wherein in the CDMA2000 standard family two different slot lengths are used for EvDO (Evolution-Data Optimized) and 1×RTT (1 times Radio Transmission Technology). For W-CDMA and CDMA2000, the modulo of the code is different. A W-CDMA frame consists of 150 sub-slots, whereas the frame length in CDMA2000 is 128 for EvDO, short and long, and 128 for 1×RTT, short only, while long is a rolling code which is a function of previous execution. Also, the chip-rate in W-CDMA is 3.84 Mcps while in CDMA2000 it is either 1.28 Mcps or 3.84 Mcps (megachips per second).

SUMMARY OF THE INVENTION

The present invention provides a multimode rake receiver, a cellular base station and a cellular communication device as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the present invention may for the most part, be implemented using electronic components and circuits known to those skilled in the art, details will not be explained in any greater extent than that considered necessary, as illustrated, for the understanding and appreciation of the underlying concepts of the present invention and in order not to obfuscate or distract from the teachings of the present invention.

Figure 1:
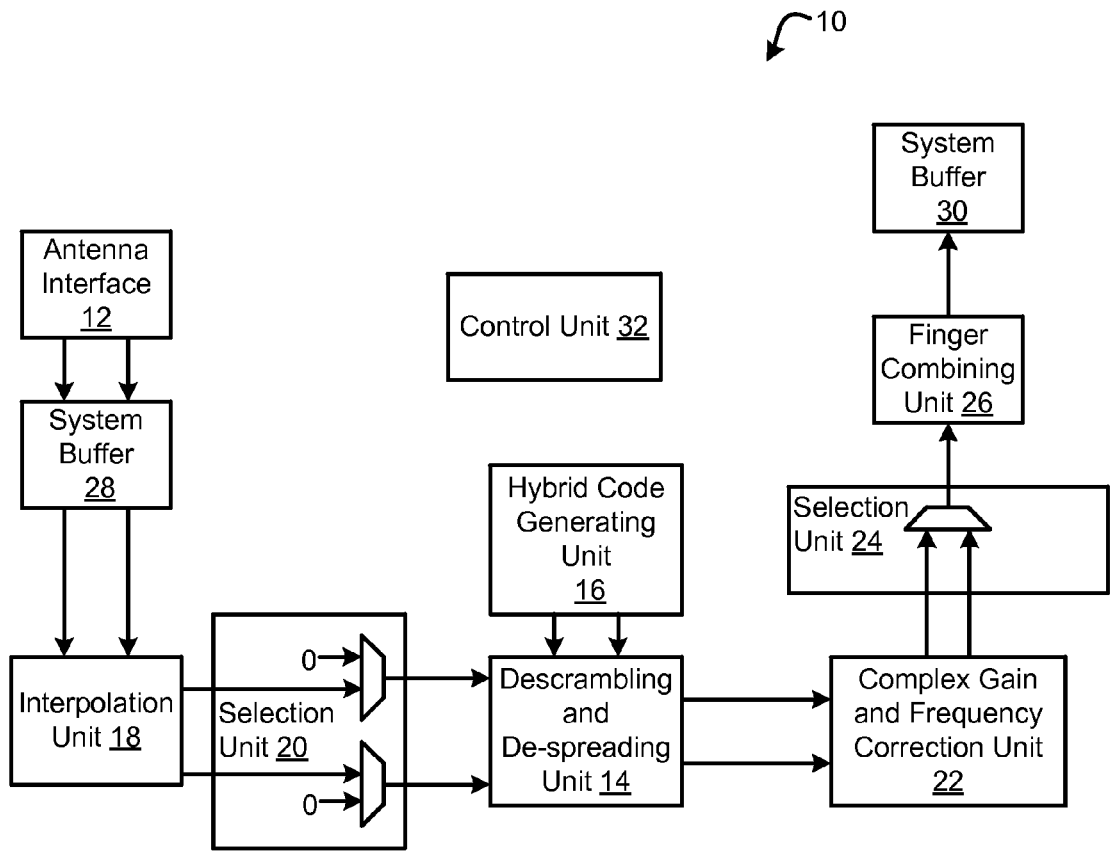
FIG. 1 schematically shows a block diagram of an embodiment of a multimode rake receiver.

Referring to FIG. 1, a block diagram of an embodiment of a multimode rake receiver 10 is schematically shown. The multimode rake receiver 10 comprises a common antenna interface 12, arranged to at least receive in a first mode a first CDMA radio channel carrying information encoded according to a first baseband modulation standard and to receive in a second mode a second CDMA radio channel carrying information encoded according to a second baseband modulation standard; and a common signal processing path, at least arranged to process in the first mode the first CDMA radio channel and in the second mode the second CDMA radio channel, wherein the common signal path comprises a common descrambling and de-spreading unit 14 and a common hybrid code generating unit 16 arranged to provide to the common descrambling and de-spreading unit chip codes applicable in the first mode to the first CDMA radio channel and in the second mode to the second CDMA radio channel.

A chip sequence may, for example, be a pseudo-noise (PN) code sequence used in direct-sequence code division multiple access (CDMA) channel access techniques. The chip rate of a code may be the number of pulses per second, or chips per second, at which the code is transmitted or received. The chip rate may be larger than the symbol rate. One symbol is represented by multiple chips.

The multimode rake receiver 10 may be arranged to operate in at least two different modes corresponding to two different baseband modulation standards, such as W-CDMA and CDMA2000, which support channel access methods to CDMA encoded radio channels. A CDMA radio channel may correspond to the signals transmitted by a sender to the receiver that are identified by the same chip code used for spreading the original narrowband signal across a wideband frequency spectrum. A CDMA radio channel may, for example, comprise the transmitted information data organized in frames of symbols, such as bits.

A common component of the multimode rake receiver may refer to a component that is used for receiving or processing incoming radio channels at least in both the first and the second mode of operation. A common component is a shared component, i.e., for example, the same common antenna interface is used during operation in first and in second mode. The common signal processing path uses the same components in first and in second mode.

The common hybrid code generating unit 16 may be arranged to provide the required chip codes for de-spreading and the required filter masks for descrambling the input CDMA radio channel, wherein suitable data may be calculated and provided to the descrambling and de-spreading unit depending on the current mode of operation, which may correspond to the baseband modulation standard used for encoding the transmitted signal at the sender side.

The common hybrid code generating unit 16 may, for example, provide a single API towards the complete rake receiver. It may, for example, support generation of W-CDMA OVSF (Orthogonal variable spreading factor), scrambling code, CDMA2000 long-codes as well as short PN sequences and Walsh codes, for example for 1×RTT/EV-DO ACH/TCH channels. The common hybrid code generating unit 16 may, for example, allow application of Walsh codes directly over the scrambling code, allowing re-use of code/data separation structure for the first and second mode.

A multimode rake receiver 10 arranged to support different modes corresponding to different CDMA radio channels encoded according to different baseband modulation standards may, for example, allow for manufacturing cellular base stations or cellular communication devices applicable in regions where mobile communication is based either on the first or the second or concurrently on both supported baseband modulation standards. Instead of providing separate components dedicated to processing first or second mode CDMA radio channels, providing common components may allow to reduce the required chip area. Fewer components may, for example, consume less power, may be programmed with less complexity and may allow for increased speed of operation.

The first baseband modulation standard and the second baseband modulation standard may comprise the W-CDMA standard and the CDMA2000 standard. These standards are the currently most widely used standards employing a CDMA based channel access, covering, for example, great parts of Europe, Japan and America. Providing an efficient, low-cost and low-power rake receiver may be interesting because of the high amount of required rake receiver devices.

The common signal path may comprise an interpolation unit 18 arranged to at least in the first mode interpolate a portion of the received first CDMA radio channel and in the second mode interpolate a portion of the received second CDMA radio channel, using a programmable interpolation window, and to provide an interpolated first or second CDMA radio channel. Interpolation may be performed by reading over each portion of the received channel many times from certain offsets. A programmable interpolation window may refer to an interpolation window with an adjustable size, where the size may be adjusted depending on the current mode, i.e., the current requirements of the current baseband modulation standard. For example, in W-CDMA systems users, i.e. senders operate asynchronously to each other and the base station (BTS). Up to, for example, 255 chips may differentiate between different users slot start, not including the air delay spread. Interpolating a received channel that may have such a high variability may be handled by using a large interpolation window, thereby resulting in a slower interpolation speed. In CDMA2000 systems, users may be synchronized to the base station. All users may start to transmit their slot at the same time, and are received at up to an air delay spread time. Interpolation may be performed faster, using a small interpolation window.

The descrambling and de-spreading unit 14 may be connected to receive at least a portion of the interpolated first or second CDMA radio channel as the first CDMA radio channel or the second CDMA radio channel, i.e., the descrambling and de-spreading unit 14 may be connected to the interpolation unit 18, either directly or, for example, through another unit arranged to provide only portions of the interpolation result to the descrambling and de-spreading unit 14.

For example, the common signal processing path may comprise a first selection unit 20 arranged to receive the interpolated first or second CDMA radio channel and to select and provide to the descrambling and de-spreading unit 14 a real portion and/or an imaginary portion of the interpolated first or second CDMA radio channel. W-CDMA is based on transmitting complex channels, i.e., radio channels comprising a real and an imaginary channel component, which may usually be represented as a channel component phase-shifted in relation to the corresponding real channel component. The possibility to transmit real and imaginary portions of the processed radio channel is indicated in FIG. 1 by two parallel arrows. On the other hand, 1×RTT of the CDMA2000 standard family is based on complex and real-valued channels. The first selection unit 20 may, for example, enable decoding the real-valued 1×RTT access channel over a data path arranged to handle complex channels, for example when operating in a W-CDMA environment. The first selection unit may allow using different combinations of discarding and post-processing the results externally.

The common signal processing path may comprise a common complex gain and frequency correction unit 22 connected to receive descrambled and de-spreaded first or second CDMA radio channels. Since gain and frequency correction may be performed similarly in the first and second modes, the complex gain and frequency correction unit 22 may be a common, i.e. shared, unit of the common signal processing path.

The common signal processing path may comprise a second selection unit 24 connected to receive and arranged to select, depending on the first and second mode, real or imaginary portions of symbols comprised in a complex gain and frequency corrected first or second CDMA radio channel. The selection unit may, for example, be implemented using a multiplexer, a switch or any other device suitable for selecting data streams of de-spreaded radio channels. The selection may depend on the current mode of operation, i.e., the requirements of the applied baseband modulation standard.

Due to the previous selection, finger combining of the processed channel consisting of received multipath signals may be performed in the first and in the second mode by a common finger combining unit 26. The common signal processing path may comprise a common finger combining unit 26 connected to the second selection unit 24 and arranged to receive the selected real or imaginary symbol portions.

The common signal processing path may be connected to the common antenna interface 12 via a first system buffer 28. The data resulting from the presented baseband processing, for example the output of the finger combining unit 26, may be buffered for further processing of the contained information in a second system buffer 30, which may or may not be the first system buffer 28.

The multimode rake receiver 10 may comprise a control unit 32 connected to the common signal processing path and arranged to control a PN code sequence generation of the hybrid code generating unit 16 depending on the first and second mode. The control unit 32 may be connected to any component of the rake receiver and may, for example, be arranged to provide control signals to the components, for example, regarding which mode of operation to apply, which parameter set to use, which interpolation window size to apply, whether to use real or/and imaginary part of a channel. The control unit 16 may be arranged to control and adjust the PN code, i.e. the pseudo-noise chip code, generation of the hybrid code generating unit.

The control unit 16 may, for example, be arranged to reset in the first mode the PN code sequence generation for the first CDMA radio channel after descrambling and de-spreading all symbols belonging to one frame contained in the first CDMA radio channel, and to determine in the second mode a current position within a PN code sequence for the second CDMA radio channel depending on an initial synchronization with a global clock.

For example, in W-CDMA the PN code sequence generation may be reset regularly after processing a complete frame, for example every 10 ms, whereas in CDMA2000, the PN code, which usually is a long-code, may not be often reset by the transmitting and receiving entities, but may be generated according to a globally available time or clock information, for example accessible through GPS, the global positioning system. The control unit may, for example, receive the time information once, e.g., provided through a GPS receiver comprised in a base station containing the multimode rake receiver 10. With this time information, the control unit 16 may track or provide the necessary information to the hybrid code generating unit 16 to track the current long-code and generate the correct chip codes. This long-code internal state roll-over may negate the need for external calculation and initialization of the long-code sequence for each executed time period. The operation may be agnostic to the chip rate (1.2288 Mcps vs. 3.84 Mcps).

The control unit 16 may, for example, comprise shift registers, logic gates and a clock.

Due to the reduced size and the reduced power consumption, the shown multimode rake receiver 10 may be provided in a system-on-a-chip, integrated on a single integrated circuit die.

Figure 2:
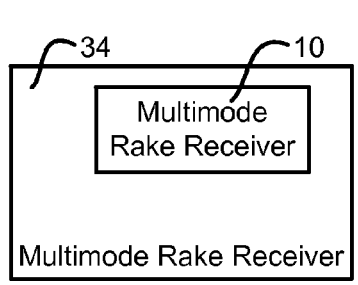
FIG. 2 schematically shows a block diagram of an embodiment of a cellular base station.

Referring to FIG. 2, a block diagram of a cellular base station 34 is schematically shown.

A cellular base station 34 or base transceiver station (BTS), cell site or Node B (UMTS) is a piece of equipment that facilitates wireless communication between cellular communication devices and a network. The shown cellular base station 34 may comprise a multimode rake receiver 10 as described above.

Due to the reduced size and power requirements, the shown cellular base station is suitable for size- or power-restricted application. The cellular base station 34 may, for example be a femtocell, i.e. a base station or HNB (Home NodeB) for a microcell or a picocell. A microcell is a cell in a mobile phone network served by a low power cellular base station (tower), covering a limited area such as a mall, a hotel, or a transportation hub.

Figure 3:
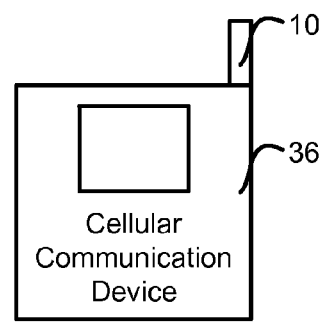
FIG. 3 schematically shows a block diagram of an embodiment of a cellular communication device.

Referring to FIG. 3, a diagram of an embodiment of a cellular communication device 36 is schematically shown. The cellular communication device 36 may comprise a multimode rake receiver 10 as described above. A cellular communication device may, for example, be a cell phone (mobile phone) or smart phone.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, the hybrid code generatin unit 16 and the control unit 32 may be provided as separate blocks or together as a single block.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, the multimode rake receiver 10 may be provided as a single SoC. Alternatively, the example may be implemented as any number of separate integrated circuits or separate devices interconnected with each other in a suitable manner. For example, the antenna and antenna interface 12 may be implemented separately from the components of the signal processing path.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While the principles of the invention have been described above in connection with specific apparatus, it is to be clearly understood that this description is made only of way of example and not as a limitation on the scope of the invention.

The invention claimed is:

1. A multimode rake receiver, comprising
 a common antenna interface, arranged to at least receive in a first mode a first CDMA radio channel carrying information encoded according to a first baseband modulation standard and to receive in a second mode a second CDMA radio channel carrying information encoded according to a second baseband modulation standard;
 a common signal processing path, at least arranged to process in said first mode said first CDMA radio channel and in said second mode said second CDMA radio channel, wherein said common signal path comprises:
  a common descrambling and de-spreading unit; and
  a common hybrid code generating unit arranged to provide to said common descrambling and de-spreading unit chip codes applicable in said first mode to said first CDMA radio channel and in said second mode to said second CDMA radio channel; and
 a control unit to communicate with the common descrambling and de-spreading unit, and with the common hybrid code generating unit, the control unit to provide a first control signal to the common descrambling and de-spreading unit and to the common hybrid code generating unit, the first control signal to cause the common descrambling and de-spreading unit and the common hybrid code generating unit to be in the first mode, and to provide a second control signal to the common descrambling and de-spreading unit and to the common hybrid code generating unit, the second control signal to cause the common descrambling and de-spreading unit and the common hybrid code generating unit to be in the second mode, the common descrambling and de-spreading unit to operate in only one of the first mode or the second mode at any given point of time depending on whether the first control signal or the second control signal is received.

2. The multimode rake receiver according to claim 1, wherein said first baseband modulation standard and said second baseband modulation standard comprise the W-CDMA standard and the CDMA2000 standard.

3. The multimode rake receiver according to claim 1, wherein said common signal path comprises an interpolation unit arranged to at least in said first mode interpolate a portion of said received first CDMA radio channel and in said second mode interpolate a portion of said received second CDMA radio channel, using a programmable interpolation window, and to provide an interpolated first or second CDMA radio channel.

4. The multimode rake receiver according to claim 3, wherein said descrambling and de-spreading unit is connected to receive at least a portion of said interpolated first or second CDMA radio channel as said first CDMA radio channel or said second CDMA radio channel.

5. The multimode rake receiver according to claim 4, wherein said common signal processing path comprises a first selection unit arranged to receive said interpolated first or second CDMA radio channel and to select and provide to said descrambling and de-spreading unit a real portion and/or an imaginary portion of said interpolated first or second CDMA radio channel.

6. The multimode rake receiver according to claim 1, wherein said common signal processing path comprises a common complex gain and frequency correction unit connected to receive descrambled and de-spreaded first or second CDMA radio channels.

7. The multimode rake receiver according to claim 6, wherein said common signal processing path comprises a second selection unit connected to receive and arranged to select, depending on said first and second mode, real or imaginary portions of symbols comprised in a complex gain and frequency corrected first or second CDMA radio channel.

8. The multimode rake receiver according to claim 7, wherein said common signal processing path comprises a common finger combining unit connected to said second selection unit and arranged to receive the selected real or imaginary symbol portions.

9. The multimode rake receiver according to claim 1, comprising a control unit connected to said common signal processing path and arranged to control a PN code sequence generation of said hybrid code generating unit depending on said first and second mode.

10. The multimode rake receiver according to claim 9, wherein said control unit is arranged to reset in said first mode said PN code sequence generation for said first CDMA radio channel after descrambling and de-spreading all symbols belonging to one frame contained in said first CDMA radio channel, and to determine in said second mode a current position within a PN code sequence for said second CDMA radio channel depending on an initial synchronization with a global clock.

11. The multimode rake receiver according to claim 1, wherein said multimode rake receiver is provided in a system-on-a-chip.

12. A cellular base station, comprising a multimode rake receiver according to claim 1.

13. The cellular base station according to claim 12, wherein said cellular base station is a femtocell.

14. A cellular communication device, comprising a rake receiver according to claim 1.

15. A multimode rake receiver comprising:
a common antenna interface to receive, in a first mode, a first CDMA radio channel carrying information encoded according to a first baseband modulation standard, and to receive, in a second mode, a second CDMA radio channel carrying information encoded according to a second baseband modulation standard;
a common descrambling and de-spreading unit;
a common hybrid code generating unit to provide, in the first mode, the common descrambling and de-spreading unit with first chip codes applicable to the first CDMA radio channel encoded according to the first baseband modulation standard, and to provide, in the second mode, second chip codes applicable to the second CDMA radio channel the second baseband modulation standard; and
a control unit to communicate with the common descrambling and de-spreading unit, and with the common hybrid code generating unit, the control unit to provide a first control signal to the common descrambling and de-spreading unit and to the common hybrid code generating unit, the first control signal to cause the common descrambling and de-spreading unit and the common hybrid code generating unit to be in the first mode, and to provide a second control signal to the common descrambling and de-spreading unit and to the common hybrid code generating unit, the second control signal to cause the common descrambling and de-spreading unit and the common hybrid code generating unit to be in the second mode, the common descrambling and de-spreading unit to operate in only one of the first mode or the second mode at any given point of time depending on whether the first control signal or the second control signal is received.

16. The multimode rake receiver of claim 1, wherein the first baseband modulation standard is a W-CDMA standard, and the second baseband modulation standard is a CDMA2000 standard.

17. A method comprising:
receiving, at a common antenna interface in a first mode, a first CDMA radio channel carrying information encoded according to a first baseband modulation standard;
receiving, at the common antenna interface in a second mode, a second CDMA radio channel carrying information encoded according to a second baseband modulation standard; and
providing a first control signal to a common hybrid code generating unit to cause the common hybrid code generating unit to be in a first mode;
in response to the common hybrid code generating unit being in the first mode, providing, by the common hybrid code generating unit, a common descrambling and de-spreading unit with first chip codes applicable to the first CDMA radio channel encoded according to the first baseband modulation standard;
providing a second control signal to the common hybrid code generating unit to cause the common hybrid code generating unit to be in a second mode; and
in response to the common hybrid code generating unit being in the second mode, providing, by the common hybrid code generating unit, the common descrambling and de-spreading unit second chip codes applicable to the second CDMA radio channel the second baseband modulation standard, the common descrambling and de-spreading unit to operate in only one of the first mode or the second mode at any given point of time depending on whether the first control signal or the second control signal is received.

18. The method of claim 17, further comprising:
processing, at a common signal processing path in the first mode, the first CDMA radio channel encoded according to the first baseband modulation standard; and
processing, at the common signal processing path in the second mode, the second CDMA radio channel encoded according to the first baseband modulation standard.

19. The method of claim 17, wherein the first baseband modulation standard is a W-CDMA standard, and the second baseband modulation standard is a CDMA2000 standard.

20. The method of claim 17, further comprising:
receiving, at the descrambling and de-spreading unit, a portion of interpolated first CDMA radio channel as the first CDMA radio channel.

* * * * *